United States Patent [19]

Ghiardo

[11] 4,452,402
[45] Jun. 5, 1984

[54] ELECTRIC CONTROL FOR YARN FEEDING DEVICES

[75] Inventor: Fiorenzo Ghiardo, Vigliano Biellese, Italy

[73] Assignee: ROJ Electrotex S.p.A., Biella, Italy

[21] Appl. No.: 341,552

[22] Filed: Jan. 21, 1982

[30] Foreign Application Priority Data

Jan. 26, 1981 [IT] Italy .............................. 19318 A/81

[51] Int. Cl.³ .......................................... B65H 51/20
[52] U.S. Cl. ............................................... 242/47.01
[58] Field of Search .............. 242/47.01, 47.02, 47.03,
242/47.04, 47.05, 47.06, 47.07, 47.08, 47.09,
47.1, 47.11, 47.12, 47.13, 36, 37, 39, 45, 47;
139/452; 66/132 T, 132 R

[56] References Cited

U.S. PATENT DOCUMENTS 4,132,368  1/1979  Schiess et al. ..................... 242/47.01
4,298,172  11/1981  Hellstrom ......................... 242/47.01

*Primary Examiner*—Stanley N. Gilreath
*Attorney, Agent, or Firm*—Young & Thompson

[57] ABSTRACT

An electric device for the control of yarn feeding devices for weaving machines, of the type providing for the presence of a yarn supply wound onto a drum and comprising an electric three-phase driving motor, wherein, in order to change the speed of the motor, this latter is supplied with AC voltage, phase controlled by triacs. For this purpose, three signals are used representing a selected speed for the motor, the true speed of the motor itself and, respectively, the presence of the yarn supply on the drum, these signals being compared and processed into an electronic circuit, in order to produce signals forthe control of the triacs. The three signals are compared in a circuit generating a signal which must in turn be compared with three periodic ramp signals having the same phase and a period half those of the three supply voltages of the motor, in order to generate square wave signals for energizing the corresponding triacs.

8 Claims, 5 Drawing Figures

ELECTRIC CONTROL FOR YARN FEEDING DEVICES

BACKGROUND OF THE INVENTION

1. Field of the Invention

The present invention relates to an electric control for the operation of devices feeding the yarn to weaving machines, particularly the weft yarn to weaving looms.

It is known that the yarn feeders for weaving machines are devices meant to draw the weft yarn from the reels or the like, wind a small amount or supply of said yarn onto a yarn storage drum, said yarn being then fed to the yarn picking members which draw it from said supply at a low and constant tension, and said supply being continuously re-formed as the yarn gets drawn, through the discontinuous operation of the winding members.

It is also known that all the yarn feeders for weaving machines in use are electrically operated and that the main characteristics required for the electric devices operating said feeders are: the possibility to adjust, in a continuous way and to a wide extent, the rotation speed; the possibility to enjoy short acceleration and braking times; and the possibility to keep the speed constant at the selected value.

2. Description of the Prior Art

There are at present devices for feeding yarn to weaving machines which essentially make use, for winding the yarn supply, of direct current motors or else of frequency change alternate current motors. On the other hand these devices do not have the aforespecified characteristics to a satisfactory extent, whereby it appeared necessary —with the development of the increasingly fine performances required from the feeders— to provide devices for the operation of such feeders which would satisfy the present requirements and those of the future.

SUMMARY OF THE INVENTION

The object of the present invention is to provide a device which answers the above purposes, suitable for a yarn feeder of the type providing for the presence of a yarn supply wound onto a drum and comprising an electric three-phase driving motor. Said device is essentially characterized in that, in order to change the speed thereof, said motor is supplied with AC voltage, phase controlled by triacs, and in that three signals are used representing a selected speed for the motor, the true speed of the motor itself and, respectively, the presence of the yarn supply on the drum, said signals being compared and processed into an electronic circuit in order to produce signals for operating said triacs.

Preferably, the said three signals are compared in a circuit generating a signal which must in turn be compared with three periodic ramp signals having the same phase and a period half those of the three supply voltages of the motor, in order to generate square wave signals energizing the corresponding triacs. Also, preferably, each of the said ramp signals is generated by a ramp generating circuit synchronized by a signal sent from a circuit detecting the passage through zero of the corresponding motor supply voltage. Moreover, said signals representing the speeds and the presence of yarn on the drum are compared also in a further electronic circuit, which is adapted to generate a signal for energizing the supply of a winding adapted to brake the motor when the signal indicating the presence of yarn supply has a zero value, the energizing of said winding being interrupted when the motor rotation speed is very low.

BRIEF DESCRIPTION OF THE DRAWINGS

The invention will now be described in further detail, by mere way of example, with reference to a preferred embodiment thereof, shown in the accompanying drawings, in which.

DESCRIPTION OF THE PREFERRED EMBODIMENTS

Figure 1:
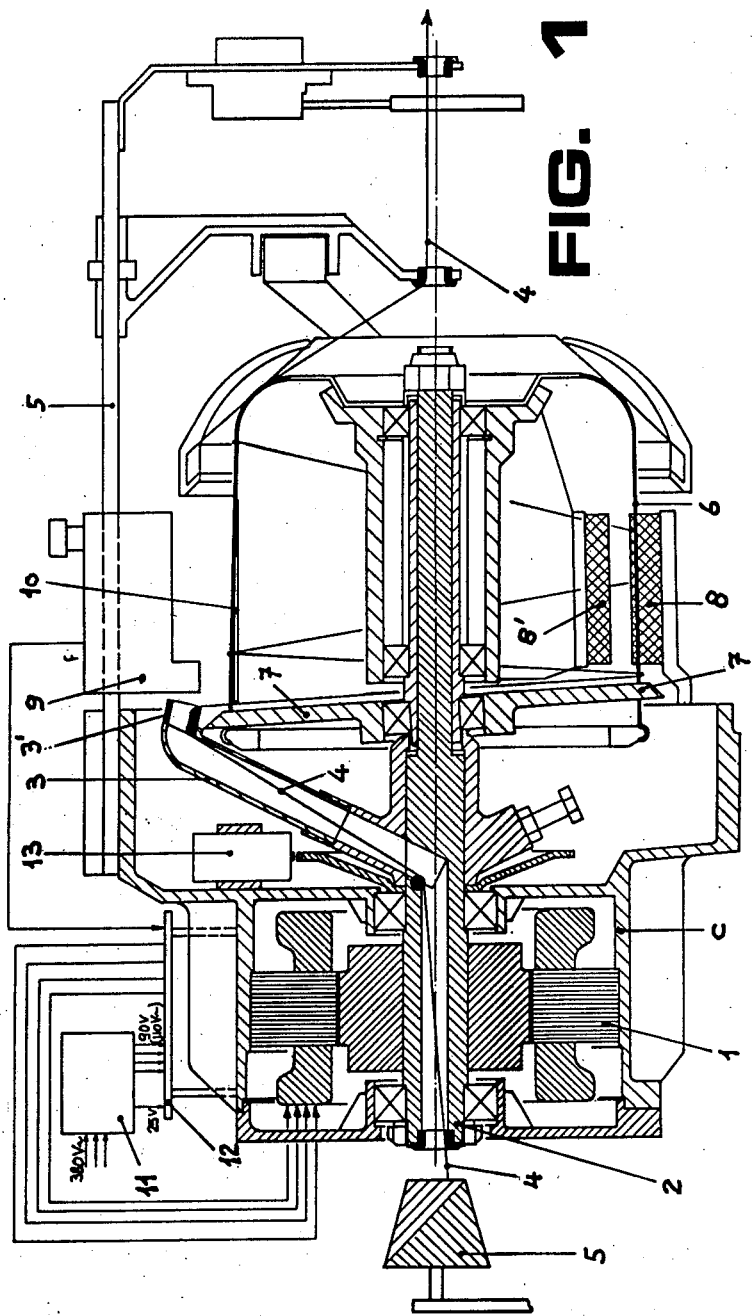
FIG. 1 is an axial section view of a weft yarn feeding device for weaving looms without shuttles, containing a block diagram of the electric control device, of the present invention, operating said weft yarn feeding device; the device itself.

The weft yarn feeding device shown in FIG. 1 comprises, within a frame or casing C, a three-phase motor 1, the shaft 2 of which is hollow, so as to allow the passage of the yarn to be fed, and the motor includes a transverse tube 3, appropriately bent and curved at its free end towards a thread guide eyelet 3', into which extends the cavity of the shaft. The weft yarn 4 is intermittently unwound overhead from a reel or spool 5, at an average speed depending on the weaving machine being fed by the device, and in a manner such as to form a yarn "balloon" between the spool 5 and the device itself.

The weft yarn 4 then passes through the hollow shaft 2, the tube 3 and, through rotation of this latter, it is arranged in adjacent turns onto the drum 6, forming thereon a yarn supply.

The drum 6 has a slightly conical shape and each turn, as it is being arranged thereon, gets pushed forward, on the drum itself, by an oscillating disc 7 mounted eccentrically on the motor shaft 2 and pushes in turn, towards the right in the drawing, the previously arranged turns.

The drum 6 is itself mounted on the shaft 2 by means of bearings and it is stopped from rotating by the pairs of opposed permanent magnets 8 and 8', one of which is fixed onto the casing C. Thus, when working, the device produces a winding of weft yarn supply formed by close, but not superposed, turns which will then be unwound, starting from the right of said winding, with an extremely reduced friction (and therefore at a low and constant tension).

The width of the yarn supply is adjusted by the position of the photoelectric cell 9, which is adjustable on the bracket S of the casing C.

So long as a reflector 10 provided on the drum 6 is not covered by the yarn, and thus sends back to the photoelectric cell 9 the beam of light issued therefrom, said cell 9 will produce a constantly "high" signal "f" (i.e. equal to the supply voltage of the control circuit) meaning "yarn missing" and will conrol therewith the rotation of the motor. When, however, the turns of the yarn winding start to cover the reflector 10, the beam of light will no longer be reflected and the "f" signal produced by the photoelectric cell 9 will drop to zero, stopping the motor 1.

The motor 1, unlike those used in the known yarn feeding devices, is a three-phase motor supplied with AC voltage, phase controlled by triacs. To said motor are convected—as diagrammatically shown in FIG. 1—a power supply 11, an electronic printed control circuit 12 (the block diagram showing the operation of which is illustrated in FIG. 2) and a speedometer dynamo 13.

The power supply 11—which is separate from the heretofore described yarn feeding device (of which form instead an integral part the other components of the electric control device according to the invention) and which may be provided to supply several of these devices, on the same loom—substantially consists of a mains supplied (for instance, at 380 V) three-phase transformer, which has two secondary windings. From the first secondary of said transformer, a three-phase voltage is drawn at 90 or 110 V for a mains frequency of 50 or 60 Hz respectively, for the supply of the motor 1 through the control circuit 12, while from the other secondary, a direct voltage, filtered and rectified, is drawn at 25 V, for the supply of the conrol circuit 12 and of the winding braking the motor 1.

The control circuit 12 (FIG. 2) is a printed electronic circuit, through which the three-phase voltage RST from the power supply 11, after having passed a reversing switch 14 (to be used for reversing, when required, the rotation sense of the motor 1), supplies the windings I, II and III of the motor 1, under the control of triacs $T_1$, $T_2$, $T_3$, (acting as switches, in known manner), which are in turn controlled by signals sent from circuits processing the said voltage in accordance to the rotation speed to be imparted on the motor 1.

Figure 2:
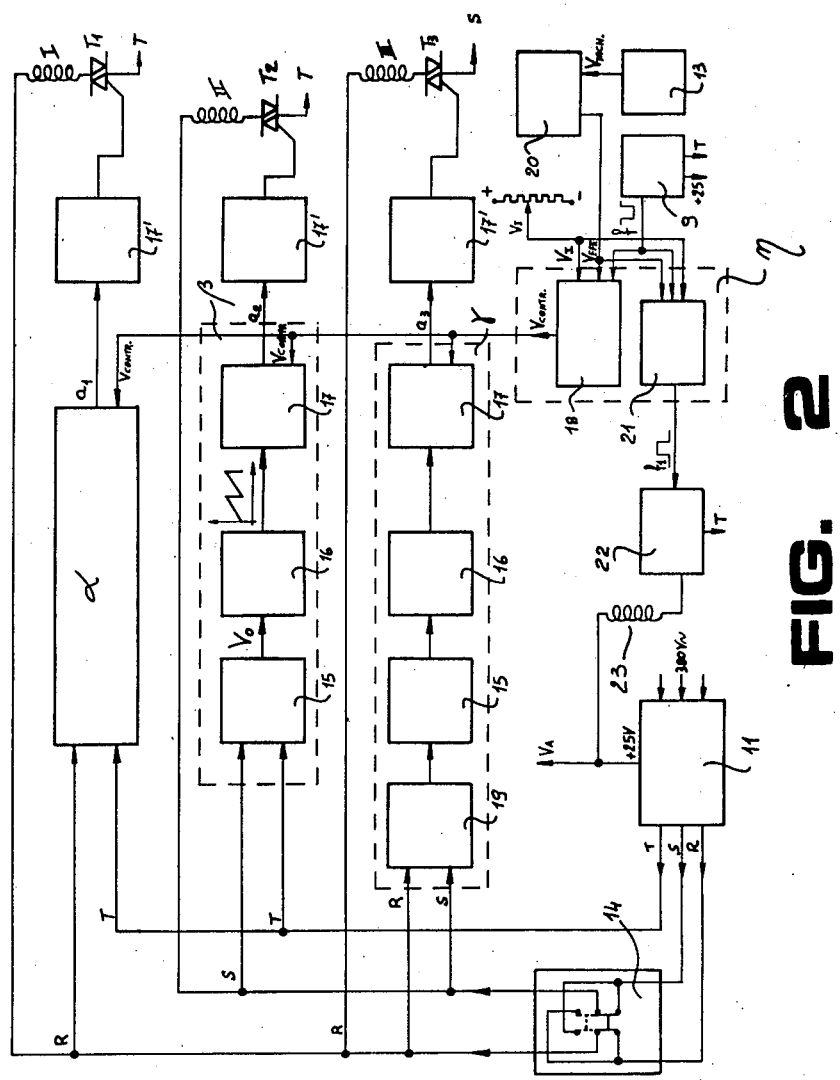
FIG. 2 is a detailed block diagram of the circuit controlling said electric control device, which illustrates the generation of the various signals and their interconnection and application.

In FIG. 2, the said voltage processing circuits have been represented in simplified form (as a simple block $\alpha$) for the phase RT, and in a more detailed form (but enclosed in the blocks $\beta$ and $\gamma$ in dashed lines) for the phases ST and RS. As seen with reference to the phase ST, these circuits provide, for each phase, a zero detector 15 which generates a signal $V_0$ (FIGS. 2 and 3) with the same phase as the voltage ST, a generator 16 of ramp signals, synchronized on the signal $V_0$, which generates ramps lasting half a period and with the same phase as the corresponding motor supply voltage (represented on the third diagram of FIG. 3), and a comparator 17, which compares the generated ramp signal with a control voltage signal $V_{CONTR}$ sent from a control voltage generator 18. The square wave signal $a_2$ (FIGS. 2 and 3) sent from the comparator 17 controls the energizing of the triac $T_2$ through a starter 17'.

What has been said also applies to the phases RT and RS, with the only difference that, as to phase RS, it is necessary to precede the zero detector 15 with a decoupler 19.

The control voltage generator 18 receives a selected input voltage $V_I$ (FIG. 2), which corresponds to the speed programmed for the motor 1, an input signal f generated by the photoelectric cell 9, and an input voltage $V_{EFF}$ representing the true rotation speed of the motor, generated by a frequency/voltage converter 20.

Figure 4:
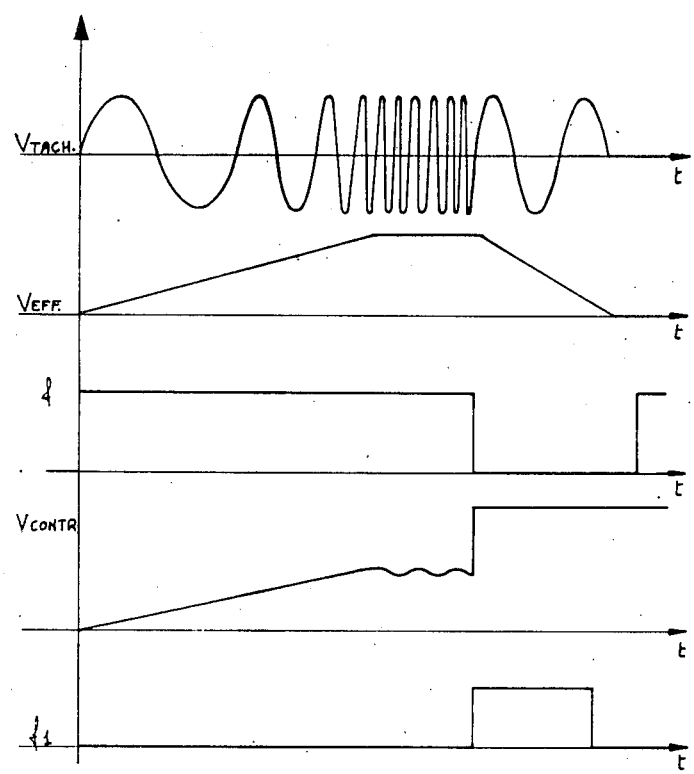
FIG. 4 shows the dynamic course as a function of time, of the main quantities and signals acting on the electric control device.

The converter 20 receives in turn a sinusoidal input signal $V_{TACH}$ generated by the speedometer dynamo 13 (FIGS. 1 and 2), the frequency of which is proportional to the rotation speed of the motor 1 (FIG. 4). The generator 18 compares the two voltages $V_I$ and $V_{EFF}$ in order to send the proper control voltage signal $V_{CONTR}$. This $V_{CONTR}$ signal prevails over the voltage $V_I$ when the f signal drops to zero, thereby indicating the presence of yarn supply on the drum 6; thus, in this case, the voltage $V_{EFF}$ is compared with f (namely, with zero).

Furthermore, the signals $V_I$, $V_{EFF}$ and f are also inputs for a comparator 21 (FIG. 2), which is adapted to send a signal $f_1$ to a circuit 22 controlling the supply of the winding 23 braking the motor 1, which supply—as will be remembered—is provided by the 25 V direct output voltage of the power supply 11.

The same 25 V direct output voltage of the power supply 11 supplies the control circuit 12, as diagrammatically indicated by the arrow $V_4$.

A brief description will now be given of the working of the electric control device according to the invention.

Figure 3:
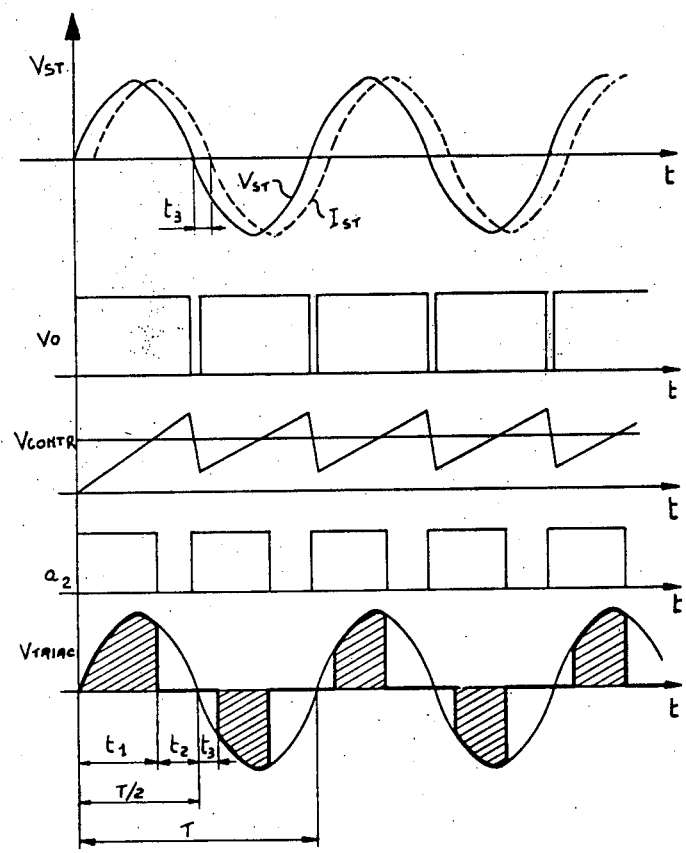
FIG. 3 shows a series of diagrams indicating the course, in function of time, of the main quantities and signals used for the operation of the electric control device in a steady state.

On starting of the yarn feeding device, the speed of the motor is down to zero and the signal $V_{EFF}$ is therefore also zero. The signal $V_I$ consequently is far higher than $_{EFF}$. Now the signal V $V_{CONTR}$ is always lower than the ramp signal (see the third diagram of FIG. 3), so as to cause the blocks $\alpha$, $\beta$ and $\gamma$ to produce signals $a_1$ $a_2$ and $a_3$ which energize the triacs $T_1$, $T_2$ and $T_3$. The motor 1 is thereby supplied and its speed increases. $V_{EFF}$ also increases and approaches $V_I$. At first, the triacs remain active through the whole period of the voltage (which period is indicated by T in the last diagram of FIG. 3), while the motor 1 rapidly accelerates; subsequently, as $V_{EFF}$ gets closer to $V_I$, the signal $V_{CONTR}$ rises so as to intersect the ramp signal produced by the generator 16—as shown in FIG. 3—and therefore acts so as to reduce the conduction angle of the triacs to the time $t_2+t_3$ (where t is the delay of current I in respect of the voltage V, see the first and last diagrams of FIG. 3), and so as to cause the supply of the motor 1 to take place substantially in a manner such as to keep an equilibrium between $V_{EFF}$ and $V_I$. In fact, in the comparator 17, the signal $V_{CONTR}$ and the ramp signal are compared, and the signal $a_2$ being sent (fourth diagram of FIG. 3) is a square wave signal which blocks the triac $T_2$ for the time $T_1$ (last diagram of FIG. 3).

When the winding of yarn supply on the drum 6 of the device has been completed, the signal f of the photoelectric cell 9 drops to zero—as already mentioned—and it prevails over the signal $V_I$, whereby the generator 18—receiving a signal $V_{EFF}$ corresponding to the true rotation speed of the motor, which is far higher than the signal $V_I$, now being zero—brings $V_{CONTR}$ to a value which is higher than the ramps of the signal sent by the generator 16 (third diagram of FIG. 3): hence, the triacs now remain inactive through the whole period T and leave the motor 1 without supply. The rotation speed of the motor thereupon starts to decrease. Nonetheless, for the yarn feeding device to work correctly, it is indispensable for the deceleration of the motor, in this phase, to be fast and it is hence necessary to resort to a braking action.

This task is accomplished by the comparator 21, which also compares $V_I$ with $V_{EFF}$ and, when it detects that $V_{EFF}$ is far higher than $V_I$ (as happens in fact when $V_I=0$), sends to the brake control circuit 22 a signal $f_1$ which causes the electric supply of the winding 23 braking the motor 1.

When, after part of the yarn supply was unwound, the signal f of the photoelectric cell 9 is given again, $V_{EFF}$ will again be less than $V_I$, and the initial conditions will occur again.

To make it simpler, the previous explanations have been referred to a single phase, but they could be repeated, exactly in the same manner, for the other two phases.

In practice, the motor does not usually stop its rotation (it is in fact appropriate to adjust $V_I$ so that this does not happen, in order to avoid the risk of undesired changes in the tension of the yarn being fed from the device), whereby successive slackenings and accelerations normally take place, fairly close to an average value of the rotation speed depending on the selected speed value, that is on $V_I$. It should be noted that, in the event of the loom stopping, or of any other cause which may determine a prolonged braking signal, the brake control signal will be de-energized when the value of $V_{EFF}$ drops below a given threshold, in order to thus prevent supplying the winding braking the motor and any useless overheatings and consumptions.

FIG. 4 contains five diagrams which illustrate the behaviour of the electric control device according to the invention, dynamically as a function of the time t.

The first diagram shows the signal $V_{TACH}$ sent by the speedometer dynamo 13 in the starting phase, under steady conditions and in the braking phase of the motor 1.

The second diagram represents the output $V_{EFF}$ from the converter 20, in correspondence with the various phases illustrated by the previous diagram.

The third diagram shows how the signal f of the photoelectric cell 9 varies in the course of the operating cycle of the device represented in the previous diagrams.

The fourth diagram shows how the signal $V_{CONTR}$ sent by the generator 18 varies in the course of the same cycle.

Finally, the fifth diagram of FIG. 4 illustrates the law by which the brake signal $f_1$ varies in relation to the previous diagrams.

Figure 5:
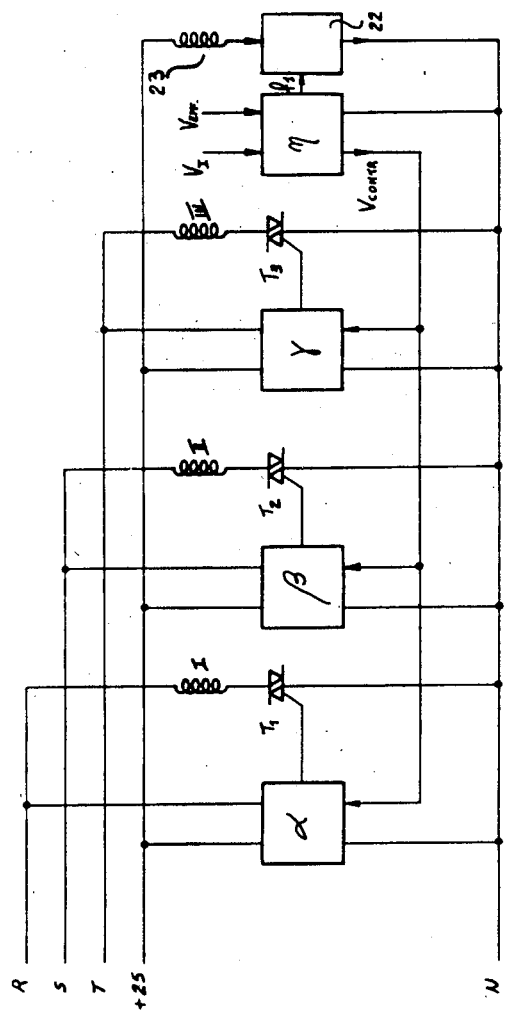
FIG. 5 is a block diagram, similar to but less detailed than that of FIG. 2, relating to a different embodiment of the circuit controlling the electric device according to the invention.

FIG. 5 illustrates a different embodiment of the electric device according to the invention.

While in the heretofore described embodiment, the motor 1 is a three-phase delta-supplied motor, the embodiment of FIG. 5 provides for the use of a three-phase star-supplied motor. This different supply determines a different arrangement of the connections, which is hence diagrammatically illustrated. The diagram of FIG. 5 again illustrates the blocks α, β and γ (herein all simplified), which are similar to those of FIG. 2, except for the block γ which, in the embodiment of FIG. 5, does not require the presence of the decoupler 19. Furthermore, the block η of FIG. 5 represents the generator 18 and the comparator 21 of FIG. 2. This embodiment has the advantage of eliminating the use of the decoupler 19 for the third phase (RS) and of a pulse transformer which was instead indispensable, always for the third phase of the previous embodiment, for energizing the triac T3.

The electric control device for yarn feeding devices according to the present invention is adapted to satisfy the strictest requirements of the users, and it is particularly useful for application on yarn feeders for shuttleless weaving looms with high working speed.

As can be seen, with said control device the rotation speed can be continuously and extensively adjusted. The acceleration and braking times are short and, above all, the speed most efficiently keeps very close to the selected values.

The control device of the present invention offers remarkable advantages, as to structural simplicity and working safety, in respect of the known devices which change the speed of the driving motor by varying the frequency of the supply voltage. Moreover, this invention involves lower manufacturing costs and requires less maintenance. It is hence widely preferable to the said known devices in the heretofore specified field of use.

I claim:

1. Apparatus for controlling the feeding of yarn from a spool in a weaving machine, comprising
   (a) a conical drum;
   (b) electric three-phase motor means (1) having three windings, said motor means including means for winding the yarn about said conical drum at various speeds;
   (c) AC power supply means (11) for producing a three-phase voltage for operating said motor means; and
   (d) phase control means (12) for controlling the phase of said power supply means to control the winding speed of said motor means, said phase control means including
      (1) first means for producing a first signal ($V_1$) corresponding with a programmed winding speed of said motor means;
      (2) second means for producing a second signal ($V_{EFF}$) corresponding with the actual winding speed of said motor means;
      (3) third means for producing a third signal (f) corresponding with the absence of yarn wound on said drum;
      (4) means (18) for generating a control voltage signal ($V_{CONTR}$) in response to said first, second, and third signals;
      (5) voltage processing circuit means ($\alpha, \beta, \gamma$) for generating a ramp signal for each phase of said power supply and for comparing each of said ramp signals with said control voltage signal to produce first ($a_1$), second ($a_2$), and third ($a_3$) control signals, respectively;
      (6) first ($T_1$), second ($T_2$), and third ($T_3$) triac means responsive to said first, second and third control signals, respectively, for controlling the supply of said three-phase voltage to said three motor windings, respectively, said control voltage signal ($V_{CONTR}$) being operable to increase the speed of said motor means when said first signal is greater than said second signal, said control voltage signal being also operable to decrease the speed of said motor means when said third signal reaches zero.

2. Apparatus as defined in claim 1, wherein each of said voltage processing circuit means comprises
   (i) zero crossing detector means (15) for producing a signal (Vo) in response to the passage of the corresponding motor supply voltage through zero;

(ii) ramp generating circuit means (16) for producing a ramp signal synchronized by said zero crossing signal; and (iii) first comparator means (17) for comparing said ramp signal with said voltage control signal.

3. Apparatus as defined in claim 2, wherein said phase controlling means further includes (7) a braking winding (23) for braking said motor means; and (8) second comparator means (21) for comparing said first, second, and third signals to generate a braking signal (f₁) to energize said braking winding when said third signal has a zero value.

4. Apparatus as defined in claim 3, wherein said braking winding is inoperable when the winding speed of said motor is below a predetermined low value.

5. Apparatus as defined in claim 2, wherein said motor means is delta-supplied.

6. Apparatus as defined in claim 5, wherein one of said voltage processing circuit means further includes decoupling circuit means (19) for delivering a voltage to said zero crossing detector means.

7. Apparatus as defined in claim 1, wherein said motor means is star-supplied.

8. Apparatus as defined in claim 1, wherein said phase controlling means further comprises two-phase reversing switch means (14) arranged between said power supply and said phase controlling means for reversing the winding rotation of said motor means.

* * * * *